K. ALQUIST.
GEARING.
APPLICATION FILED JUNE 22, 1918.
1,351,320.
Patented Aug. 31, 1920.
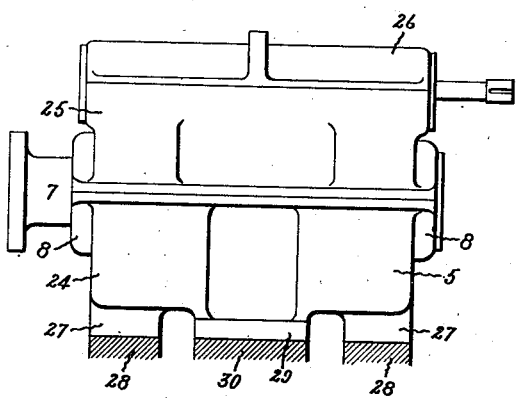
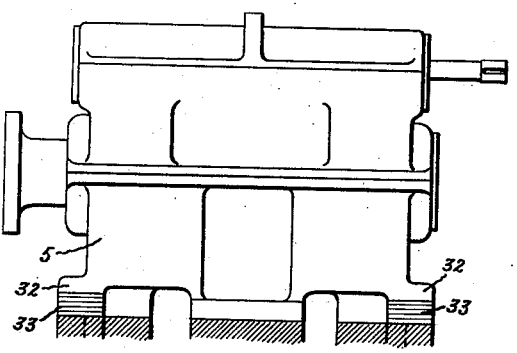
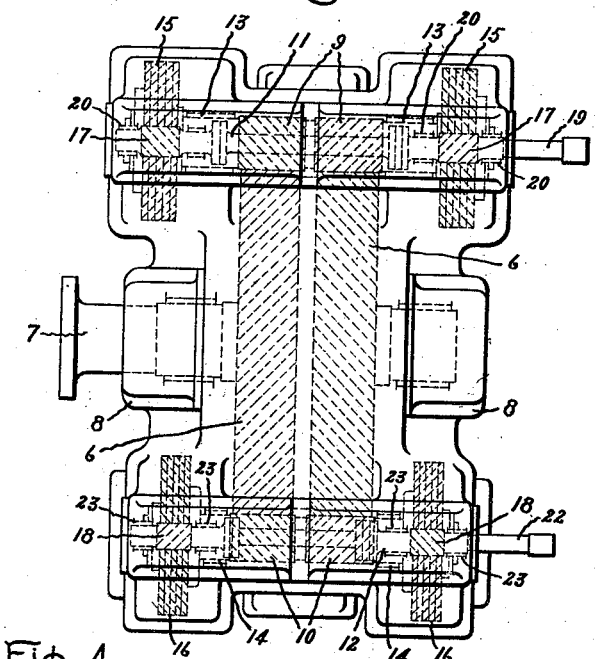
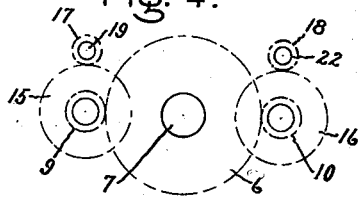
Inventor:
Karl Alquist,
by *Albert G. Davis*
His Attorney.

UNITED STATES PATENT OFFICE.

KARL ALQUIST, OF SCHENECTADY, NEW YORK.

GEARING.

1,351,320.  Specification of Letters Patent.  Patented Aug. 31, 1920.

Application filed June 22, 1918. Serial No. 241,345.

*To all whom it may concern:*

Be it known that I, KARL ALQUIST, a subject of the King of Sweden, residing at Schenectady, in the county of Schenectady, State of New York, have invented certain new and useful Improvements in Gearing, of which the following is a specification.

The present invention relates to gearing and is especially applicable to gearing intended to transmit loads of considerable magnitude. With such gearing the length of the gear wheels becomes considerable and it is very important to obtain a good alinement of the meshing gear wheels and maintain such alinement in order to insure even pressure and equal distribution of the load throughout their length.

The object of my invention is to provide an improved gearing structure wherein I obtain the above referred to results and for a consideration of what I believe to be novel and my invention, attention is directed to the accompanying description and the claims appended thereto.

In carrying out my invention, I mount the gearing in a casing designed so as to facilitate the operations hereinafter referred to, the bearings for the various shafts being located in the walls of the casing, and I then mount the casing itself in such a manner that it can be sprung or twisted slightly to give correct alinement to the gear wheels carried by it. To this end I preferably provide a support for the casing directly under each of the bearings for the low speed gear wheel so that such wheel is firmly supported and I then support the casing at the other gear wheel or gear wheels, or some of them, at an intermediate point only so that the casing can twist or spring around such point as a fulcrum. By this means it will be seen that the shaft bearings themselves are moved to bring and maintain the gear wheels in correct alinement.

In the drawing Figure 1 is a side elevation of a gearing and casing embodying my invention; Fig. 2 is a similar view showing how the casing may be fixed permanently in position by shimming; Fig. 3 is a top plan view of Figs. 1 and 2, and Fig. 4 is a diagram.

Referring to the drawing, 5 indicates a gear casing in the side walls of which are located suitable bearings for the shafts upon which the gear wheels are mounted. It will be understood of course that this gear casing may take various specific forms according to the nature of the gearing it is to contain. In the present instance, by way of example, the invention is shown in connection with a double reduction gearing comprising a low speed gear wheel 6 mounted on a shaft 7 which is supported in bearings 8 in the side walls of the gear casing. On opposite sides of gear wheel 6 are low speed pinions 9 and 10 mounted on shafts 11 and 12 respectively, which shafts are supported in bearings 13 and 14 in the side walls of the gear casing. Overhung on the ends of shafts 11 and 12 are high speed gear wheel members 15 and 16 respectively with which mesh the high speed pinion members 17 and 18. Pinion members 17 are mounted on a shaft 19 carried in bearings 20 and pinion members 18 are mounted on a shaft 22 carried in bearings 23. Pinion members 17 and 18 are shown as mounted vertically above gear wheel members 15 and 16 and the latter are shown as being gear wheels of the flexible type invented by me and comprising a plurality of disks or plates rigidly connected together at their central portions and slightly spaced apart at their peripheries so as to yield slightly in an axial direction under excess tooth pressure to equalize the load. The casing 5 is preferably split longitudinally on the center lines of the shafts 7, 11 and 12 to form a bottom member 24 and a top member 25 and the bearings 20 and 23 for high speed shafts 19 and 22 are located in the upper part of the top member 25 of the casing and are covered by caps or casing sections 26. A gearing as here shown is particularly illustrated, and described, and claimed in my application, Serial No. 210,955 filed January 9, 1918.

Now in carrying out my invention in connection with a gearing as here illustrated, I support the casing 5 under each of the bearings 8, the casing being provided centrally of its two sides with suitable feet 27 which rest on foundations or pedestals 28, and I support the two ends of the casing each on a single support located centrally of such end, the ends of the casing being provided with feet 29 which rest on foundations or pedestals 30. It will thus be seen that the casing is supported at its two ends directly under the central parts of the low speed pinions 9 and 10, and that as a result the portions of the casing carrying the low speed pinion bearings 13 and 14 are overhung. As a result the end portions of the casing can twist about the pedestals 30 as a fulcrum under the influence of any unequal driving pressures on the respective halves of low speed pinions 9 and 10 thus bringing about a realinement of such pinions with the gear wheel 6.

If found desirable I may use the flexible supporting of the casing for the purpose of obtaining correct alinement for the gearing and then permanently fix the casing in such position. Under these circumstances I provide the bottom of the casing with suitable finished surfaces or feet 32 preferably located at the four corners of the casing and after the casing has been mounted on its foundations as shown in Fig. 1 and run, and any inaccuracies of alinement have been observed, I then place shims 33 between feet 32 and the foundation to bring and hold the casing in the correct observed position. It may then be bolted down in this position. As is well known it can be seen by the markings on the gear teeth caused by wear whether or not the alinement is good and of course the shims can be adjusted at any time to correct for any disalinement.

In accordance with the provisions of the patent statutes, I have described the principle of operation of my invention, together with the apparatus which I now consider to represent the best embodiment thereof, but I desire to have it understood that the apparatus shown is only illustrative, and that the invention can be carried out by other means.

What I claim as new and desire to secure by Letters Patent of the United States, is:—

1. In combination, a gear casing having bearings in its walls, shafts mounted in said bearings, gear wheels carried by said shafts, supporting means for said casing located under the bearings of one of said shafts, and supporting means for said casing located between the bearings of another of said shafts.

2. In combination, a gear casing having bearings in its walls, a gear wheel, a shaft for the gear wheel mounted in some of said bearings, a pinion which meshes with the gear wheel, a shaft for the pinion mounted in other of said bearings, supports for the gear casing located under the gear wheel bearings, and a support for the casing located between the pinion bearings.

3. In combination, a gear casing having bearings in its walls, a gear wheel, a shaft for the gear wheel mounted in some of said bearings, a pinion which meshes with the gear wheel, a shaft for the pinion mounted in other of said bearings, a support for the casing located under each gear wheel bearing, and a support for the casing located between the ends of the pinion.

4. In combination, a gear casing having bearings in its walls, a gear wheel, a shaft for the gear wheel mounted in some of said bearings, pinions located on opposite sides of the gear wheel and meshing therewith, shafts for said pinions mounted in other of said bearings, supporting means for the casing located under the bearings for said gear wheel shaft, and supporting means for the casing located between the ends of each of said pinions.

5. In combination, a gear casing having bearings in its walls, a low speed gear wheel, a shaft for the low speed gear wheel mounted in some of said bearings, an intermediate speed shaft mounted in other of said bearings, a low speed pinion located at the central portion of such shaft and high speed gear wheel members located on each side of it, said low speed pinion meshing with the low speed gear wheel, a high speed shaft mounted in still other of said bearings, high speed pinion members carried thereby which mesh with said high speed gear wheel members, a support for said casing located under each of the bearings for the low speed gear wheel, and a support for it located between the ends of the low speed pinion.

6. In combination, a gear casing having bearings in its walls, a low speed gear wheel, a shaft for the low speed gear wheel mounted in some of said bearings, two intermediate speed shafts, one located on each side of the low speed gear wheel, mounted in other of said bearings, a low speed pinion located at the central portion of each of such shafts and high speed gear wheel members located on each side of such low speed pinions, said low speed pinions meshing with the low speed gear wheel, two high speed shafts mounted in still other of said bearings, high speed pinion members carried thereby which mesh with said high speed gear wheel members, a support for said casing located under each of the bearings of the low speed gear wheel, and a support for it located between the ends of each of the low speed pinions.

7. In combination, a gear casing having bearings in its walls, shafts mounted in said bearings, gear wheels carried by said shafts, rigid supporting means for said casing located under the bearings of one of said shafts, a rigid supporting means for said casing located between the bearings of another of said shafts, and adjustable supporting means located adjacent the ends of said last named shaft.

8. In combination, a gear casing having bearings in its walls, a gear wheel, a shaft for the gear wheel mounted in some of said bearings, a pinion which meshes with the gear wheel, a shaft for the pinion mounted in other of said bearings, a rigid support for the casing located under each gear wheel bearing, a rigid support for the casing located between the ends of the pinion, and adjustable supports for the casing located adjacent the ends of the pinion.

9. In combination, a gear casing having bearings in its walls, a gear wheel, a shaft for the gear wheel mounted in some of said bearings, pinions located on opposite sides of the gear wheel and meshing therewith, shafts for said pinions mounted in other of said bearings, supporting means for the casing located under the bearings for said gear wheel shaft, supporting means for the casing located between the ends of each of said pinions, and adjustable supporting means located beneath the four corners of said casing.

10. In combination, a gear casing having bearings in its walls, shafts mounted in said bearings, gear wheels carried by said shafts, and supporting means for said casing located at spaced points under the casing whereby one portion of the casing is held rigid and another portion may adjust itself to bring the gear wheels into position for meshing correctly.

11. In combination, a gear casing having bearings in its walls, a gear wheel, a shaft for the gear wheel mounted in some of said bearings, a pinion which meshes with the gear wheel, a shaft for the pinion mounted in other of said bearings, and supporting means for the casing located at spaced points whereby the portion of the casing adjacent the gear wheel is rigidly supported and the portion adjacent the pinion may adjust itself to bring the pinion into position for meshing correctly with the gear wheel.

In witness whereof I have hereunto set my hand this 20th day of June, 1918.

KARL ALQUIST.